March 4, 1941.  J. W. BYRD  2,233,832
INSECT GUARD
Filed March 21, 1940
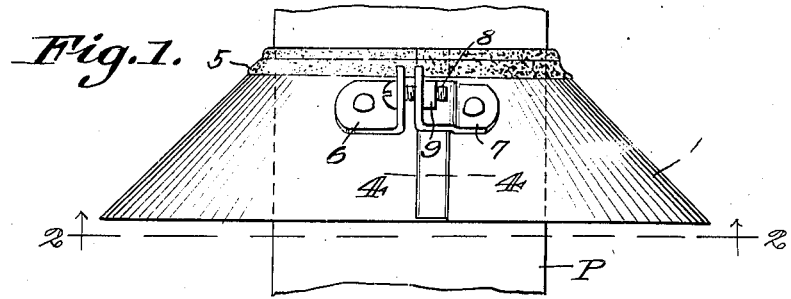
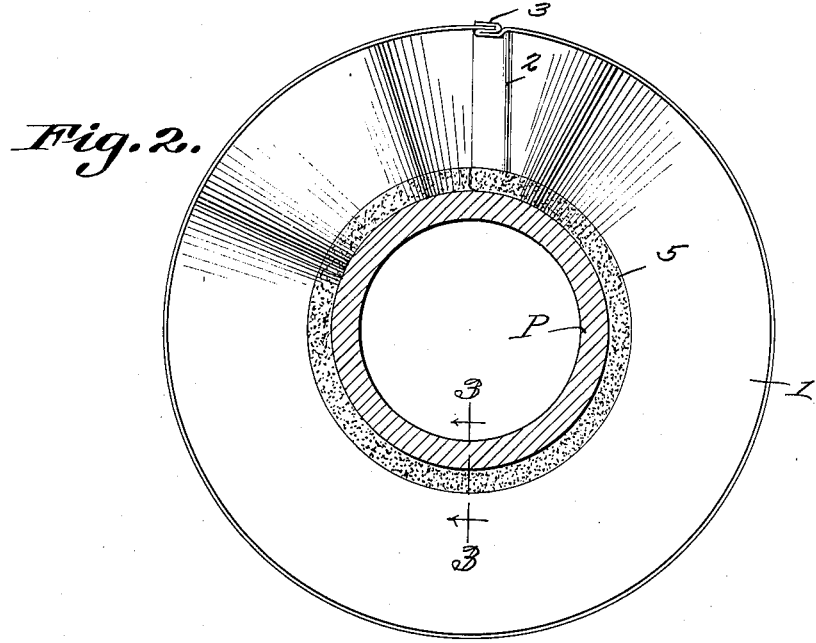
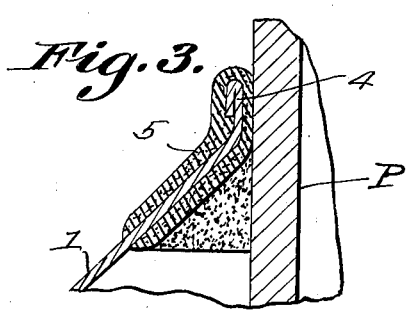
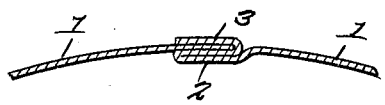
J. W. Byrd
INVENTOR.
BY *CHSnowles*
ATTORNEYS.

UNITED STATES PATENT OFFICE 2,233,832

INSECT GUARD

James W. Byrd, Miami, Fla.

Application March 21, 1940, Serial No. 325,268

1 Claim. (Cl. 43—107)

This invention relates to a guard designed primarily for application to pipes in buildings whereby wood-boring insects, which tend to follow moisture, are prevented from moving along the pipes upon reaching the installed guards.

A further object is to provide a guard or shield which is simple in construction and can be easily applied to a pipe without requiring the use of solder to insure an effective seal between the guard or shield and the pipe.

With the foregoing and other objects in view which will appear as the description proceeds, the invention consists of certain novel details of construction and combinations of parts hereinafter more fully described and pointed out in the claim, it being understood that changes may be made in the construction and arrangement of parts without departing from the spirit of the invention as claimed.

In the accompanying drawing the preferred form of the invention has been shown.

In said drawing:

Figure 1 is a side elevation of the device in position on a pipe a portion of which has been shown.

Figure 2 is a section on line 2—2, Figure 1.

Figure 3 is a section on line 3—3, Figure 2.

Figure 4 is an enlarged section on line 4—4, Figure 1.

Referring to the figures by characters of reference, I designates a strip of metal cut to such shape that, when its ends are brought together, it will define a cone frustum, the small diameter of which is slightly greater than the external diameter of the pipe to be encircled thereby. One of the ends of the strip I is offset as indicated at 2 and folded into the offset to form a channel portion 3 extending parallel to the end and from the top edge to the bottom edge of the strip. The other end of the strip is adapted to be inserted into the channel portion 3 after the strip has been placed about the pipe P on which the guard or shield is to be mounted.

The top edge of the strip I is reenforced by folding it as shown at 4 and this folded portion as well as the adjacent portion of the outer and inner surfaces of the strip are provided with a coating 5 of asphalt.

Secured on the outer surface of strip I adjacent to the respective ends thereof are brackets 6 and 7 respectively and these are adapted to be engaged by a tightening bolt 8 carrying a nut 9 or the like.

In practice a shield or guard of the desired proportions is placed about the pipe P and one end of the strip is then inserted into the channel portion 3 as shown in Figure 4. Thereafter bolt 8 is inserted into the brackets 6 and 7 and tightened by means of nut 9. Thus the two brackets will be drawn toward each other and the entire device will be drawn tightly about the pipe, squeezing the asphalt firmly against the surface of the pipe so as to effect a tight seal.

It has been found that when a pipe is equipped with a structure such as herein described, termites and other wood-boring insects are deterred from progressing along the pipe. Consequently pipes extending upwardly into woodwork and provided with guards or shields such as herein described, afford very desirable protection against damage to the wood by insects.

In lieu of asphalt any other suitable soft plastic materials useful as a seal and an insecticide could be employed.

What is claimed is:

An insect guard for a pipe, including a single strip of sheet material having a channeled portion at one end and its other end extending detachably into said portion, said strip defining a cone frustum, a soft plastic coating of sealing material on the strip along that edge thereof at the point of smallest diameter of the shield, brackets on the respective ends of the strip, and a detachable and adjustable connection between the brackets.

JAMES W. BYRD.